Dec. 15, 1953

W. M. A. ANDERSEN 2,663,006

CRYSTAL MOUNTING FOR DELAY LINES

Filed Nov. 19, 1948

INVENTOR
WALTHER M. A. ANDERSEN

BY I. Jordan Kunik
ATTORNEY

Patented Dec. 15, 1953 2,663,006

UNITED STATES PATENT OFFICE 2,663,006

CRYSTAL MOUNTING FOR DELAY LINES

Walther M. A. Andersen, Hartford, Conn., assignor to Crystal Research Laboratories, Inc., Hartford, Conn., a corporation of Connecticut Application November 19, 1948, Serial No. 61,079

4 Claims. (Cl. 333—30)

This invention relates to piezoelectric crystal mountings.

An object of the invention is to provide an extremely rugged crystal mounting system.

Another object of the invention is to provide a crystal mounting that is not made inoperative by high temperatures.

A further object of the invention is to provide a crystal mounting system wherein the acoustic response of piezoelectric crystals is broadened.

A still further object of the invention is to provide a superior crystal mounting system for solid delay lines.

Other objects of the invention will be apparent from the following description and accompanying drawing taken in connection with the appended claims. However, I desire to have it distinctly understood that I do not intend to limit myself to the exact details shown or described, but that I intend to include as part of my invention all such obvious changes and modifications of parts as would fall within the scope of the claims.

Figure 1:
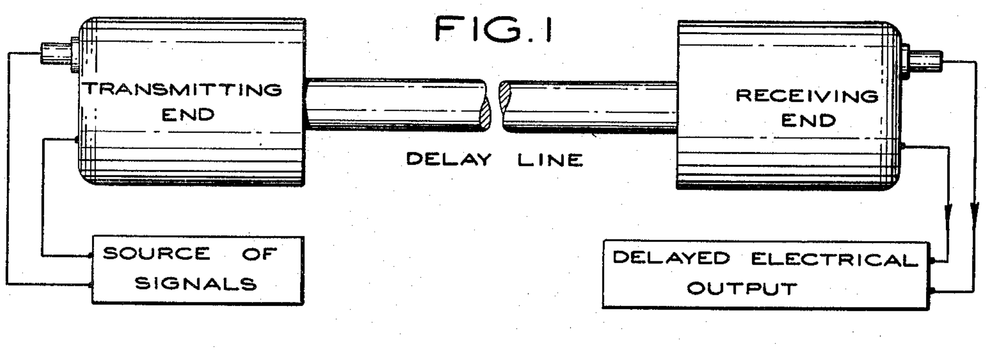
Figure 1 is a diagrammatic representation of a prototype of a delay line.

There are many applications in electronics systems such as may be found in radar, computer instruments, etc., where it is highly desirable to delay intelligence in the form of electric signals by certain finite lengths of time, of the order of a few microseconds to several milliseconds. For extremely short delays, short sections of electrical transmission lines have been used. However, for delays of 20 microseconds or greater, other means are necessary.

The supersonic delay line was developed for this application. The basic reason for using supersonic delay lines resides in the fact that sound waves travel very much more slowly than do electrical waves through free space, or through any realizable transmission line. In supersonic delay lines a piezoelectric crystal of a suitable type is energized by an electrical signal which causes it to vibrate mechanically in a way that corresponds to the electrical vibrations fed into it. This crystal, hereinafter called the transmitting crystal, is mechanically coupled to some medium which will support ultrasonic vibrations. This medium has usually, in the past, been a liquid such as mercury. The vibrations from the transmitting crystal travel along some path in the transmitting medium, and at the end of this path they impinge upon a piezoelectric crystal similar in all respects to the transmitting crystal. The mechanical vibrations from the transmitting medium impinging upon this receiving crystal cause a voltage to be generated across the crystal's electrodes which corresponds to the electrical signal applied to the transmitting crystal. The transmitting medium is commonly called the delay line. In its simpler forms it may be a tube filled with a suitable liquid, or a solid rod of some material chosen for desirable acoustic properties.

Some of the disadvantages of liquid delay lines reside in the problems of preventing liquid leakage, the fragility of the tube, the tendency for gas to appear in the tube with resulting distortion, etc. In the fabrication of solid delay lines, there has been a major problem in the method of attaching transmitting and receiving crystals to the delay lines. Cements have usually had the disadvantage of melting at relatively low temperatures, as well as forming imperfect bonds. The further disadvantage of solid lines has been the fact that the acoustic bandwidth of crystals attached to some materials has been too narrow to be useful in the storage of extremely narrow pulses. For instance, certain magnesium alloys are highly desirable from the point of view of acoustic transmission, but have always in the past had a very poor bandwidth due to their relatively low acoustic impedance. It is amongst the objects of my invention to provide (1) an extremely rugged crystal mounting system from a mechanical point of view, which is not made inoperative by high temperatures, and (2) means for broadening the acoustic response of the piezoelectric crystals to the point that delay lines made of such materials as certain magnesium alloys or other materials can be successfully used in the storage of extremely narrow pulses.

The second of the above objectives is absolutely necessary in order to have acceptable performance, and the first objective is certainly desirable for obvious reasons. A brief discussion of means for achieving a wide acoustic response covering a large frequency spectrum follows.

Most crystals, particularly quartz crystals, when vibrating freely are very sharply resonant; that is, the amplitude of their vibrations is very much larger at the resonant frequency of the crystal than at some frequency very slightly away from resonance. If a longitudinally vibrating crystal is allowed to vibrate in a vacuum so that there is no mechanical damping, extremely sharp resonance effects will be observed. If now, this same crystal is allowed to vibrate in a gas such as air, the sharpness of the resonance effects will be diminished. This is simply due to the fact that the crystal has to push the air back and forth. It is well known in acoustics that the nature of the damping effect of air, against a vibrating crystal, can be computed as the product $\rho c$ (rho $c$) where $\rho$ is the density of the air and $c$ is the velocity of sound in air. If the product $\rho c$ is increased by any means whatsoever, the resonance phenomena of a longitudinally vibrating crystal will be further diminished. If a liquid is substituted for air, and a longitudinally vibrating crystal is immersed in it, the resonance phenomena will be cut down very much more due to the fact that the $\rho c$ or acoustic impedance of any liquid is very much greater than that of any gas.

Figure 3:
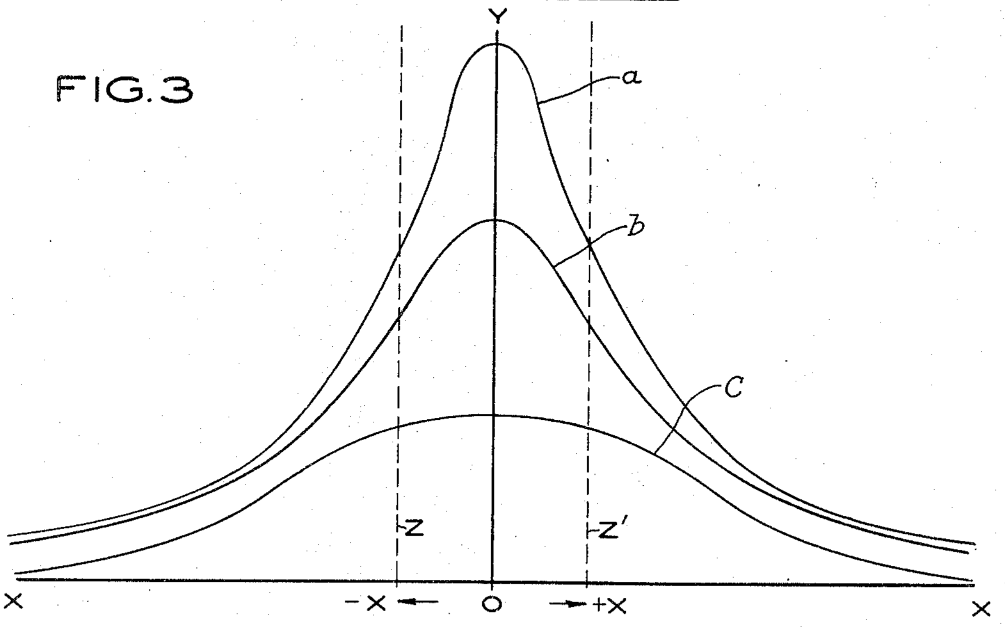
Figure 3 is a graph containing curves representing characteristics of resonance phenomena of crystals in different media.

Figure 3 shows qualitatively the effect of increasing acoustic impedance of the material in which a crystal vibrates. Figure 3 depicts three typical resonance curves symmetrical about the ordinate Y. Frequency is plotted along the abscissa X while amplitude is plotted along the ordinate Y. These resonance curves depict in this case the resonance effects of crystals acoustically loaded with materials having different acoustic impedances. The natural resonant frequency of the crystal is at X equals zero. It will be noted that in all cases at X equals less than zero or X equals greater than zero that the amplitude of the crystal response decreases. It will further be noted that the maximum amplitude of curve *a* depicts the amplitude/frequency response of a crystal loaded with a material having relatively low acoustic impedance.

Curve *b* depicts amplitude/frequency response of a crystal loaded with a material having a considerably greater acoustic impedance than that depicted in curve *a*. Curve *c* depicts the amplitude/frequency response of a crystal loaded with an acoustic material having a very high acoustic impedance. It is immediately apparent that in all cases the maximum amplitude occurs at X equals zero. It is also immediately apparent that the amplitude decreases with increased acoustic impedance of the loading material. In all cases depicted in the resonance curves it is assumed that the driving voltage is equal and is maintained constant throughout the frequency spectrum delineated.

Lines Z and Z′ have been drawn perpendicular to the X axis and spaced equidistant to the Y axis on each side of the Y axis. It can be seen that there is a very wide variation of amplitude between X equals zero and through the points on the X axis intercepted by lines Z and Z′ in the case of curve *a*. In this same distance the response curve *b* is considerably flatter. This tendency is still further emphasized in curve *c*.

When it is necessary to derive supersonic vibrations involving a wide frequency spectrum it is obvious that the type of response shown in curve *c* is necessary. The present invention results in delay line performance that can be typified by response curve *c* of Figure 3.

It will be seen that with very high acoustic impedance in the material in which a crystal vibrates, that the crystal vibrates just as hard, or very nearly just as hard, a considerable distance away from its natural resonant frequency. In the past, many practical delay lines have been built where a longitudinally vibrating crystal transmits vibrations through mercury. Due to the great density of mercury, the acoustic impedance of mercury is sufficiently high so that X-cut quartz crystals are just about critically damped. That is, the Q is of the order of unity. In solid delay lines it is common practice to use crystals which vibrate in thickness shear since by this means it is possible to couple into a delay line acoustic vibrations travelling transversely in respect of the longitudinal dimension of the delay line. Since these transverse vibrations travel more slowly in the solid delay line than do longitudinal vibrations, and since transverse vibrations reflected at grazing angles do not generate undesired spurious modes of vibrations as do longitudinal waves, it is highly desirable in most applications to use only transverse vibrations in solid supersonic delay lines of any considerable length. It has been common practice to cement Y-cut or other suitable cuts of quartz crystals onto solid delay lines using either phenyl salicilate or phenyl benzoate as a cementing material. However, due to imperfect bonding there is a certain slippage between the crystal and the delay line. This slippage may be considered a shunt compliance in a mechanical filter system which very effectively and undesirably narrows the bandwidth. Thus, although theoretical computations indicate that certain magnesium delay lines do not have as wide a bandwidth as would be desired, it develops that experimental models with cemented crystals attached onto them are even poorer than the theory would indicate.

Therefore, the first problem to be circumvented in designing a mounting system which will result in increased bandwidth, is to prevent as much as possible slippage between the crystal and the delay line. I have conceived the idea of using between the crystal and the delay line a thin foil of some such relatively soft material as tin, for instance, which under considerable pressure would bond itself closely to the crystal and the line. It would then be possible to control the effectiveness of the bond by controlling the pressure applied to the crystal. This first step is realized in my invention and all indications are that the performance is all that it should be. In order to bring this pressure to bear on the crystal, it is necessary to apply this pressure from some flat surface.

In the past, the side of the crystal not attached to the delay line has usually, in the case of solid delay lines, been left to vibrate freely against air. However, by applying pressure through some flat solid material against this side of the crystal, according to the present invention, the crystal is further damped than it had been before and, therefore, a still further increase in acoustic response results. In brief, it has been possible by this pressure mounting system to achieve extremely wide bandwidth and great mechanical ruggedness.

In Figure 1 there is shown a prototype of a delay line system. Electrostatic shielding cans house the piezoelectric transmitting and receiving crystals and their pressure mounting devices to the delay line.

Figure 2:
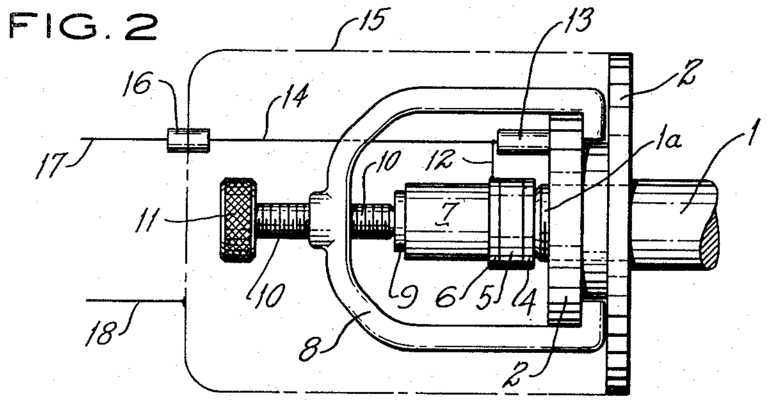
Figure 2 is a detail diagrammatic side view of the crystal mounting embodying the present invention.

Figure 2 is a detailed diagrammatic view of one embodiment of my invention. Since the mounting structure of both transmitting and receiving piezoelectric crystals are identical, only one typical delay line crystal mounting is shown in Figure 2. Delay line 1 is made of some suitable solid material such as, for example, magnesium or certain magnesium alloys, fuzed quartz, aluminum or aluminum alloys, suitable glasses or other metals chosen for their desirable acoustic properties in a given application. Clamp mount 2 is attached to the end of said delay line by threads or other means so that the end 1a of the line projects through said clamp a suitable distance. Between piezoelectric crystal 5 and the end 1a of the delay line is interposed a small metal foil 4 of tin (shown greatly enlarged for purposes of clear illustration). Instead of tin foil, use can be made of thin foils of pliable, electrically conductive metals such as, for example, gold, aluminum, silver and the like. It is to be noted that foil 4 is in contact with the delay line 1 and, therefore, is at the same electrical potential as said line. Thus the side of the crystal which rests against foil 4 can be considered the grounded side of the crystal if a common ground, which is usually desirable, is used. A solid member 7, serving as an "end cell" is brought to bear upon crystal 5 with another metallic foil 6 interposed between said member and said crystal. Foil 6 is not at the same potential as the delay line 1.

Clamp 8 interlocking with mount 2 is provided with a screw 10, turned by knurled head 11, which serves to maintain the assembly of the various elements under firm pressure. Block 9, preferably made of steel, is provided to distribute the pressure from the point of screw 10 over the whole end cell to prevent the fracture of said cell. Wire 12 electrically connects foil 6 to the junction insulator 13, at which point wire 12 is connected to wire 14 which leads through shield 15 by way of insulating bushings 16 to the external electrical connection 17.

It is possible, and even desirable to have the member 7 made of some dielectric material so as to minimize stray capacitance across the crystal 5, as well as to insulate foil 6 from the clamping device 8 which is at the same electronic potential as the delay line 1 and foil 4. Member 7 has a threefold function: (1) it serves as a means for applying pressure to the crystal; (2) it serves as a means of insulating foil 6 from foil 4; and (3) it serves as an "end cell" which results in increased acoustic response due to greater acoustic loading.

The end cells 7 of Figure 2 should preferably be made of some solid dielectric material characterized by high acoustic absorption. Such materials may be suitable plastics such as Bakelite or material known under the trade name of Mycalex, or some suitable ceramic. When such an end cell is provided, energy arriving at the receiving crystal which is not converted into an electric signal is acoustically transmitted through the crystal into the end cell and there dissipated as heat. The small portion of acoustic energy not converted into an electrical signal, and not transmitted into the end cell and absorbed in it, will reflect back to the transmitting crystal where the bulk of this energy will be abstracted and dissipated in the end cell associated with the transmitting crystal. The result is that echoes of the desired received signals are very greatly attenuated by this means.

Foils 4 and 6 made in the order of .001 inch thick or less have been found to provide a suitable bond between the crystal and the delay line.

If the line 1 is made of glass or fuzed quartz, or other non-conducting material it will be necessary to provide electrical connecting means between foil 4 and conductor 18.

Figure 2 shows one suitable clamping arrangement for a simple rod-type solid delay line. Other clamping arrangements have been devised for other delay line configurations including fuzed quartz polygons. In all cases, however, the essentials of metal foils placed between the crystal and the line, and between the crystal and the end cell, and means for applying pressure for the same purposes as shown in the illustration, have been used.

Pressure in the order of up to 10,000 pounds and upwards per square inch has been successfully applied to the crystal by the clamp and screw means described herein. Optimum pressure will be determined by the nature of the line material used, the foil material, the crystals and end cells. For any particular arrangement it is possible to determine an optimum pressure and thence forth reproduce exactly these conditions at will. Screw 11 provides a means for making the pressure adjustment for optimum performance.

When crystals are imperfectly bonded with cements, it has been found that portions of such crystals do not properly transmit vibrations to the delay line, while other portions of the crystal are only partially bonded to the line so that most of the motion is lost as slippage. This results in a lower acoustic loading of the crystal than would be anticipated on the basis of the acoustic impedance of the line itself or of the cement between the crystal and the line.

By means of the pressure mounted crystals and the clamping technique associated with them and the associated foils and end cells, it is possible to provide uniform bonding over the whole area of the crystal according to the principles of the present invention. It is also quite possible to control the effectiveness of the bond by varying the pressure.

While the present invention, as to its objects and advantages has been described herein as carried out in specific embodiments thereof, it is not desired to be limited thereby but it is intended to cover the invention broadly within the spirit and scope of the appended claims.

I claim:

1. A crystal mounting comprising a solid delay line, a piezoelectric crystal vibrating in a shear mode transversely in respect of the longitudinal dimension of said delay line, a first metal foil interposed as a bond between said crystal and said delay line, a dielectric member, a second metal foil interposed between said crystal and said member, a clamp attached to said delay line and screw means arranged on said clamp to exert pressure upon said member whereby said assembly of foils, crystal and member are maintained under pressure against said delay line.

2. In combination, a solid delay line, a piezoelectric crystal vibrating in thickness shear and transversely in respect of the longitudinal dimension of the delay line, a metal foil interposed as a bond between said crystal and said delay line, and a clamp for maintaining pressure between said crystal and said delay line.

3. In a supersonic delay line comprising a solid delay medium, a piezoelectric crystal vibrating in a shear mode transversely in respect of the longitudinal dimension of said delay medium, a metal foil interposed between said crystal and said delay medium, a dielectric member positioned upon said crystal on a side opposite to that of the delay medium to provide an acoustic loading upon said crystal and to increase the acoustic response of the delay line, and a clamp for applying pressure between said dielectric member and said delay medium.

4. A supersonic delay line comprising a solid delay medium, a piezoelectric crystal vibrating in a shear mode transversely in respect of the longitudinal dimension of said delay medium, a dielectric end cell, a first metal foil interposed between said crystal and said delay medium, a second metal foil interposed between said crystal and said end cell and a clamp for applying sufficient pressure between said end cell and said delay line whereby an acoustic loading is applied on said crystal and the acoustic response of the delay line is increased.

WALTHER M. A. ANDERSEN.

References Cited in the file of this patent

UNITED STATES PATENTS

| Number | Name | Date |
|---|---|---|
| 1,955,471 | Pooler | Apr. 17, 1924 |
| 2,044,000 | Heising | June 16, 1936 |
| 2,137,852 | Nicolson | Nov. 22, 1938 |
| 2,411,401 | Welch | Nov. 19, 1946 |
| 2,421,026 | Hall | May 27, 1947 |
| 2,458,581 | Firestone | Jan. 11, 1949 |
| 2,505,515 | Arenberg | Apr. 25, 1950 |
| 2,512,130 | Arenberg | June 20, 1950 |